US007941550B1

(12) United States Patent  (10) Patent No.: US 7,941,550 B1
Smith et al.  (45) Date of Patent: May 10, 2011

(54) MULTIPLE COOKIE HANDLING

(75) Inventors: Brian N. Smith, Shawnee, KS (US);
Piyush Upadhyay, Overland Park, KS (US); Badri P. Subramanyan, Overland Park, KS (US); John W. Davis, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 264 days.

(21) Appl. No.: 12/370,262

(22) Filed: Feb. 12, 2009

(51) Int. Cl.
G06F 15/16 (2006.01)
G06F 3/00 (2006.01)
(52) U.S. Cl. .................... 709/228; 709/203; 715/745
(58) Field of Classification Search .................. 709/203, 709/228; 715/745
See application file for complete search history.

(56) References Cited

U.S. PATENT DOCUMENTS

| 6,609,198 | B1 * | 8/2003 | Wood et al. | 713/155 |
| 7,216,236 | B2 * | 5/2007 | Kou et al. | 713/183 |
| 2003/0110266 | A1 * | 6/2003 | Rollins et al. | 709/227 |

* cited by examiner

Primary Examiner — George C Neurauter, Jr.

(57) ABSTRACT

A method, system, and computer readable media are provided for managing multiple HTTP cookies that are present in a wireless communication system. When a secure or non-secure HTTP cookie is formed, a time of creation for that HTTP cookie is also created as part of the cookie header. Therefore, when a wireless device makes a subsequent communication to a web based server, the gateway compares the creation time for multiple HTTP cookies that are present, and only forwards the most recently created HTTP cookie to the web based server. This avoids invalidating a session as a result of receiving multiple conflicting HTTP cookies from the same wireless device.

17 Claims, 4 Drawing Sheets

MULTIPLE COOKIE HANDLING

INTRODUCTION

HTTP cookies are parcels of text or data sent by a server to a client, such as a browser, and then sent back unchanged by the client each time the client accesses that server. HTTP cookies are used by Web servers to differentiate users and to maintain data related to the user during navigation. In a wireless environment, wireless devices do not have the capability to handle HTTP cookies. Therefore, a gateway performs HTTP cookie management on behalf of the wireless device.

In a secured session, a gateway is not allowed to decrypt an encrypted message. The encrypted message is therefore, obstructed at the gateway, and the secure HTTP cookie is stored directly on the wireless device. For a non-secure session, a non-secure HTTP cookie is stored on the gateway. These two different sessions cause two different HTTP cookies from the same server to be created for the same wireless device user. When a secured session has ended, and the wireless device user visits the same site again in a non-secured session, the later session cannot be validated because the server is receiving two different HTTP cookies—one from the wireless device (secure HTTP cookie) and one from the gateway (non-secure HTTP cookie).

SUMMARY

Embodiments of the invention are defined by the claims below. A high-level overview of various embodiments of the invention is provided to introduce a summary of the systems, methods, and media that are further described in the detailed description section below. This summary is neither intended to identify key features or essential features of the claimed subject matter, nor is it intended to be used as an aid in isolation to determine the scope of the claimed subject matter.

In an embodiment of the invention, a method is described for managing wireless device communication. When a web based server receives a non-encrypted request from a wireless device, the web based server returns the requested information to the wireless device, along with a non-encrypted HTTP cookie. The non-encrypted HTTP cookie is stored on a gateway. When the web based server receives an encrypted request or session from the wireless device, the web based server returns an encrypted HTTP cookie, along with the encrypted request. Since the gateway cannot view or store an encrypted HTTP cookie, the encrypted HTTP cookie is stored directly on the wireless device. When the wireless device makes a subsequent request for non-secure information, the gateway will compare the creation time of the non-encrypted HTTP cookie with the encrypted HTTP cookie, and send the most recently created HTTP cookie to the web based server.

In another embodiment of the invention, a method is described for managing wireless device communication, in which a gateway serves as the communication intermediary between one or more wireless devices and a web based server. The gateway forwards any request from a wireless device to the web based server, along with a previously created HTTP cookie, if present. The gateway will also check for any previously created HTTP cookies in its storage for that particular wireless device and web based server. If there is more than one HTTP cookie present, then the gateway will compare the time of creation for each of the HTTP cookies. The time of creation is formed in the header of each HTTP cookie by the web based server. The gateway will then forward the most recently created HTTP cookie to the web based server, along with the wireless device request.

In another embodiment of the invention, a system of wireless communication is described, wherein multiple HTTP cookies are managed in order to avoid a session invalidation. This system of wireless communication includes one or more wireless devices, which communicate with a web based server, via a gateway. When a session request is made from a wireless device to a web based server, the gateway will check for multiple HTTP cookies that may be present. If there is more than one HTTP cookie present from the same wireless device to the same web based server, then the gateway will select the most recently created HTTP cookie and forward to the web based server. The time of creation of each HTTP cookie is formed in the header of the HTTP cookie.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Figure 1:
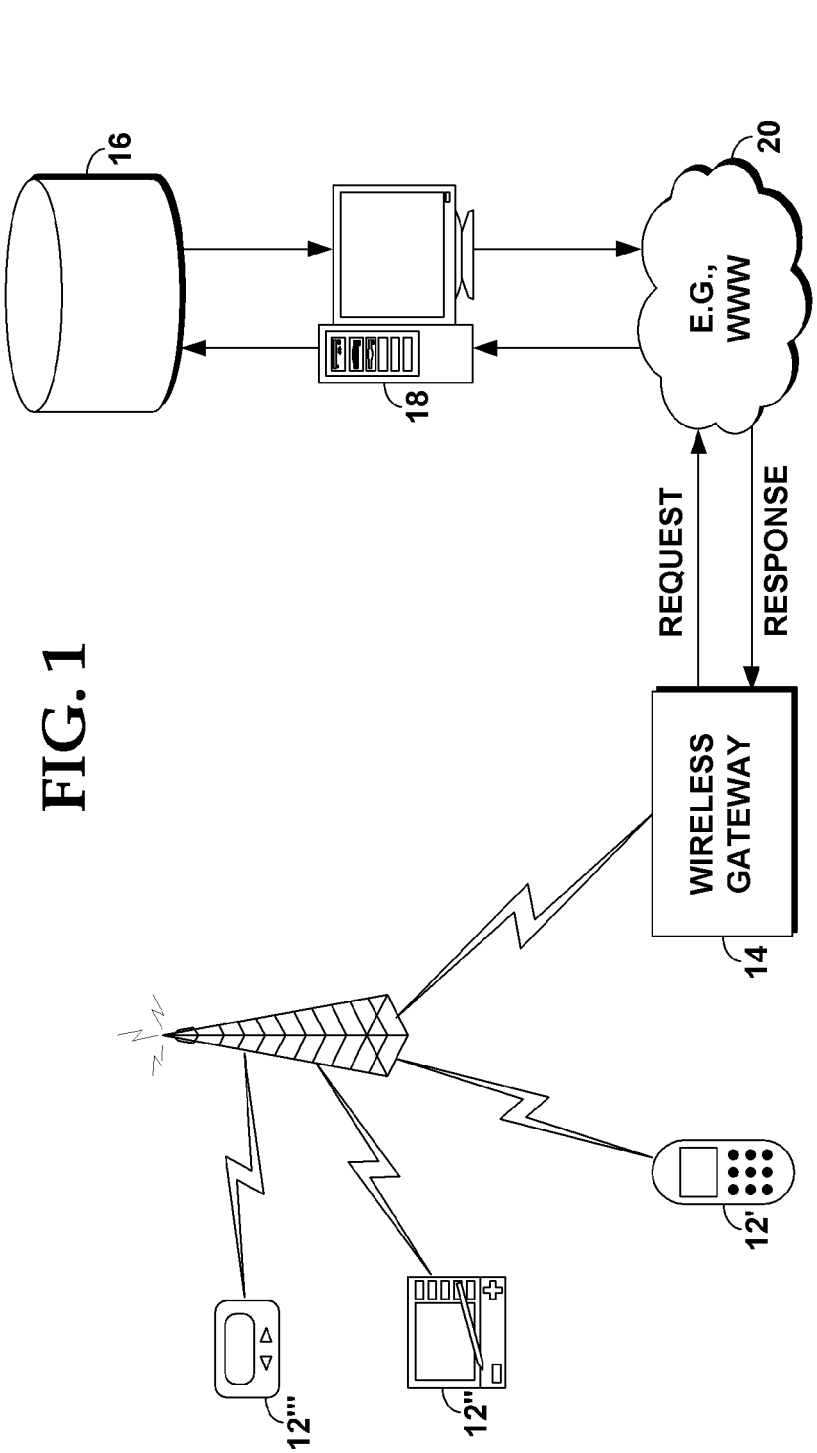
FIG. 1 is a block diagram illustrating an exemplary wireless network system.

Embodiments of the invention provide systems and methods for handling multiple HTTP cookies. This detailed description satisfies the applicable statutory requirements. The terms "step," "block," etc. might be used herein to connote different acts of methods employed, but the terms should not be interpreted as implying any particular order, unless the order of individual steps, blocks, etc is explicitly described. Likewise, the term "module," etc. might be used herein to connote different components of systems employed, but the terms should not be interpreted as implying any particular order, unless the order of individual modules, etc is explicitly described.

Throughout the description of different embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of any embodiments of the invention.

Embodiments of the invention include, among other things, a method, system, or set of instructions embodied on one or more computer-readable media. Computer-readable media include both volatile and nonvolatile media, removable and nonremovable media, and media readable by a database and various other network devices. Computer-readable media comprise computer storage media and communication media. By way of example, and not limitation, computer-readable media comprise media implemented in any method or technology for storing information. Examples of stored information include computer-useable instructions, data structures, program modules, and other data representations. Media examples include, but are not limited to, information-delivery media, Random Access Memory (RAM), Read Only Memory (ROM), Electronically Erasable Programmable Read Only Memory (EEPROM), flash memory or other memory technology, Compact Disc (CD) ROM, digital versatile discs (DVD), holographic media or other optical disc storage, magnetic cassettes, magnetic tape, magnetic disk storage, and other magnetic storage devices. These technologies can store data momentarily, temporarily, or permanently. The computer readable media include cooperating or interconnected computer readable media, which exist exclusively on a processing system or distributed among multiple interconnected processing systems that may be local to, or remote from, the processing system. Communication media can embody computer-readable instructions, data structures, program modules or other data in an electronic data signal, and includes any information delivery media. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

A summary overview of a telecommunications system will be described, with reference to FIG. 1. FIG. 1 is a block diagram illustrating an exemplary wireless network system 10. Wireless network system 10 includes wireless devices 12, wireless gateways 14, databases 16 including electronic content, database servers 18 and information network 20. However, none of the embodiments of the invention are limited to these components and more, fewer or other components can also be used in wireless network system 10. For simplicity, only one wireless gateway 14, database 16 and database server 18 are illustrated in FIG. 1.

The wireless devices 12 include wireless phones 12', personal digital assistants ("PDA") 12", one and two-way pagers 12''' and other types of wireless mobile and non-mobile devices (not illustrated). Wireless devices 12 may include devices that typically connect using a wireless communications medium such as radio frequency (RF) devices, infrared (IR) devices, or integrated devices combining one or more of the preceding devices.

The information network 20 is configured to allow network connections between a client device and other networked devices, such as database server 18. The information network 20 may be configured to employ any form of carrier medium for communicating information from one computing device to another, such as through a universal serial bus (USB) port, Ethernet link, wireless forms of carrier media, or any combination thereof. In one embodiment, the information network 20 may be the Internet, or may include local area networks (LANs), wide area networks (WANs), or direct connections.

Information network 20 may further employ a plurality of wireless access technologies including, but not limited to, $2^{nd}$ (2G), $3^{rd}$ (3G) generation radio access for cellular systems, Wireless-LAN, or Wireless Router (WR) mesh. Access technologies such as 2G, 3G, and future access networks may enable wide area coverage for network devices with various degrees of mobility. For example, the information network 20 may enable a wireless network connection over one of the aforementioned access technologies using a protocol for wireless data transfer such as Global System for Mobil communication (GSM), General Packet Radio Services (GPRS), Enhanced Data GSM Environment (EDGE), and Wideband Code Division Multiple Access (WCDMA).

The wireless gateways 14 provide a code division multiple access ("CDMA"), Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Radio Frequency ("RF"), paging and wireless messaging, Packet Cellular Network ("PCN"), Global System for Mobile Communications, "GSMC"), Worldwide Interoperability for Microwave Access (WiMAX), Generic Packet Radio Services ("GPRS"), Personal Communications Services ("PCS"), Cellular Digital Packet Data ("CDPD"), Wireless Application Protocol ("WAP"), Digital Audio Broadcasting ("DAB"), Bluetooth, 802.11a, 802.11b, or other types of wireless interfaces for the wireless devices 12. The WAP includes several protocols and standards designed to provide wireless devices with access to electronic content, and it was developed as an alternative to other markup languages and protocols developed for the World Wide Web. One component of the WAP is a Wireless Markup Language ("WML"), which includes markup tags, and provides control over formatting and layout of electronic content. The WML is often more appropriate to use for wireless devices such as wireless phones than other markup languages such as Hyper Text Markup Language ("HTML"), etc.

The wireless gateway 14 includes virtually any device that forwards network traffic. Such devices include, for example, routers, proxies, firewalls, access points, link load balancers, devices that perform network address translation, or any combination of the preceding devices. The wireless gateway 14 may recognize packets that are part of a particular communication protocol or are the same network connection or application session. The wireless gateway 14 may perform special processing on such packets including granting access to a client machine, logging or not logging an event, or network address and port translation.

The databases 16 include electronic content such as text, hypertext, graphical data or references to graphical data images, audio, video, and other content. The electronic content may be stored as a web page or WAP page on a database server, such as server 18. The server 18 can download electronic content from the database 16 to the wireless device 12.

Server 18 includes any computing device capable of establishing or maintaining a network connection with a client device. In one embodiment, server 18 is configured to operate as a web server. The server 18 can also operate as a messaging server, File Transfer Protocol (FTP) server, chat server, media server, or online gaming server. In addition, server 18 can be a single component in a larger online application. Devices that can operate as server 18 include, but are not limited to, personal computers, multiprocessor systems, microprocessor-based or programmable consumer electronics, network personal computers, or integrated devices combining one or more of the preceding devices.

A hypertext document includes markup codes called "tags." The structure of hypertext documents is defined by document markup languages such as Hand Held Device Markup Language ("HDML"), HTML, compact HTML ("cHTML"), eXtensible Markup Language ("XML"), WML and voice extensible Markup Language ("VoxML"), and others. Markup languages also allow references to additional electronic content other than text, including graphics, animation, audio, video, applets, and other electronic data.

Electronic content is displayed on a wireless device 12 with a software application, such as but not limited to a "browser." A browser on a wireless device 12 may be a subset of a larger browser, or a micro-browser. A micro-browser may not be capable of fully displaying content requested from the database server 18. A micro-browser reads electronic content and renders the electronic content into a presentation, such as but not limited to text, graphics, animation, audio, video, etc., for display on the wireless device 12.

The wireless devices 12 illustrated in FIG. 1 interact with wireless network system 10 based on standards proposed by the Institute of Electrical and Electronic Engineers ("IEEE"), International Telecommunications Union-Telecommunication Standardization Sector ("ITU"), Internet Engineering Task Force ("IETF"), Wireless Application Protocol ("WAP") Forum, Java Community, the American National Standard Institute ("ANSI"), or other standards.

An operating environment for devices and interfaces used for embodiments of the invention include a processing system with one or more high speed central processing unit(s) ("CPU"), or other types of processors, and a memory system. In accordance with the practices of persons skilled in the art, the embodiments of the invention are described below with reference to acts and symbolic representations of operations or instructions that are performed by the processing system, unless indicated otherwise. Such acts and operations or instructions are referred to as being "computer executed," "CPU executed," or "processor executed." The memory locations where data bits are maintained are physical locations that have particular electrical, magnetic, optical, or organic properties corresponding to the data bits.

Hypertext Transfer Protocol (HTTP) is a communications protocol used for retrieving inter-linked text documents (hypertext). HTTP is a request and response standard between a client, which is also known as a user agent, and a server. A mobile-to-HTTP protocol gateway (MHG) translates between standard wireless protocol commands and an application server, such as a web server on the Internet.

Figure 2:
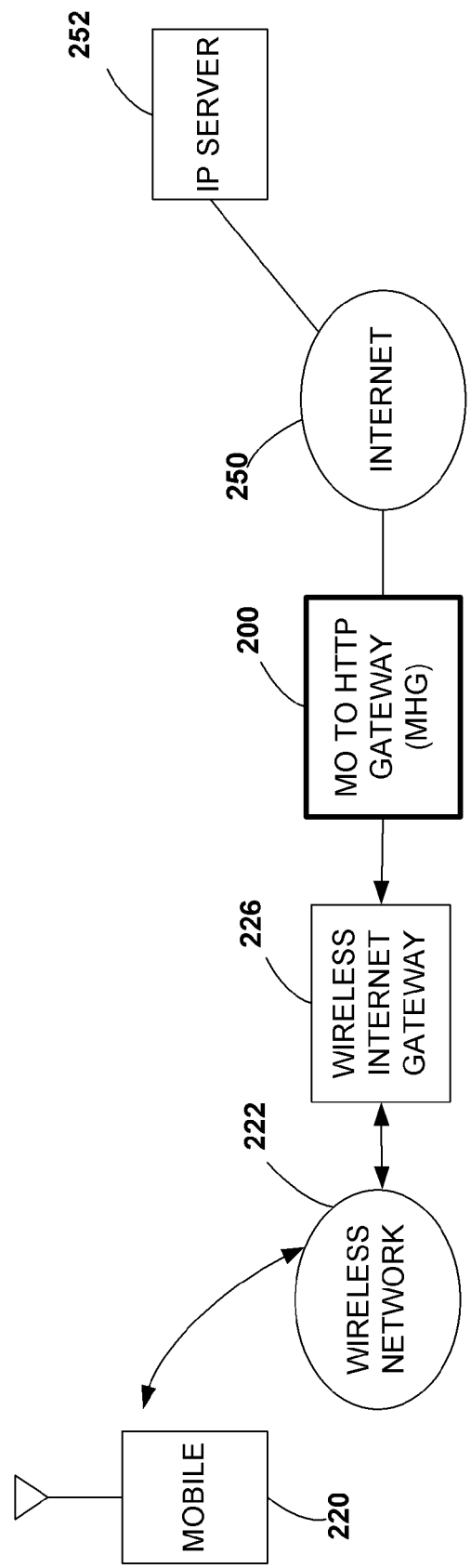
FIG. 2 is a block diagram illustrating an exemplary system adapted to push mobile originated (MO) messages to an internet protocol (IP) web server.

FIG. 2 illustrates an exemplary system adapted to pull from wireless originated messages to an Internet protocol (IP) server, using a MHG 200. A wireless Internet gateway 226 communicates with the MHG 200 to provide server-to-server capability. The MHG 200 translates standard format protocol commands from the wireless Internet gateway 226 into HTTP protocol commands, and directs the same to an appropriate IP server, such as web application server 252 in communication with the Internet 250. The MHG 200 is preferably bidirectional, in that it generates HTTP protocol commands to an application program on a relevant IP server 252 based on wireless-originated messages. It translates responses to the wireless-originated messages from HTTP protocol back into standard format messages for forwarding back to the relevant wireless device 220, via a wireless network 222.

HTTP cookies are parcels of text or data sent by a server to a client, such as a browser, and then sent back unchanged by the client each time the client accesses that server. HTTP cookies are used for activities, such as authenticating, session tracking, and maintaining specific information about users. HTTP cookies are used by Web servers to differentiate users and to maintain data related to the user during navigation, possibly across multiple visits. Without using HTTP cookies, each retrieval of a Web page or component of a Web page would be an isolated event. By returning an HTTP cookie to a Web server, the browser provides the Web server with a means of connecting the current page view with prior page views.

An HTTP cookie can have a specified deletion date, which will cause that HTTP cookie to be removed on that date. If the HTTP cookie does not specify a date, then it is removed when the user quits the browser session. Therefore, specifying a date allows an HTTP cookie to survive across sessions, which is referred to as a persistent HTTP cookie. In addition to a deletion date, other HTTP cookie attributes include a name/value pair, a path, a domain name, and whether the HTTP cookie is intended only for encrypted connections.

HTTP cookies can be used by a server to recognize previously-authenticated users. This can be accomplished, for example, by a user client inserting a username and password of a login page into a browser, and sending them to the server. The server receives and checks the username and password, and if correct, sends back a confirmation of a successful login, together with an HTTP cookie containing a random session identification (ID) that coincides with a session stored in a database. The random session ID is provided on future visits and provides a way for the server to identify the client. The browser automatically sends the HTTP cookie back to the server on each user request.

The example just described above gets more complicated if the client is a wireless device. In a wireless environment, a gateway performs HTTP cookie management on behalf of the wireless device, since the wireless device has limited capabilities. Therefore, during a non-encrypted session, the session server sends a non-encrypted HTTP cookie, which is held or managed by the gateway. However, during a secure or encrypted session, the gateway does not have the authority to intervene on behalf of the wireless device. As a result, the encrypted HTTP cookie originating from the session server is sent directly to the wireless device. At this point, two different HTTP cookies exist for the same session server. If a non-secure session is once again visited by the client, the session server will receive two different HTTP cookies. This will likely result in the session being invalidated.

Figure 3:
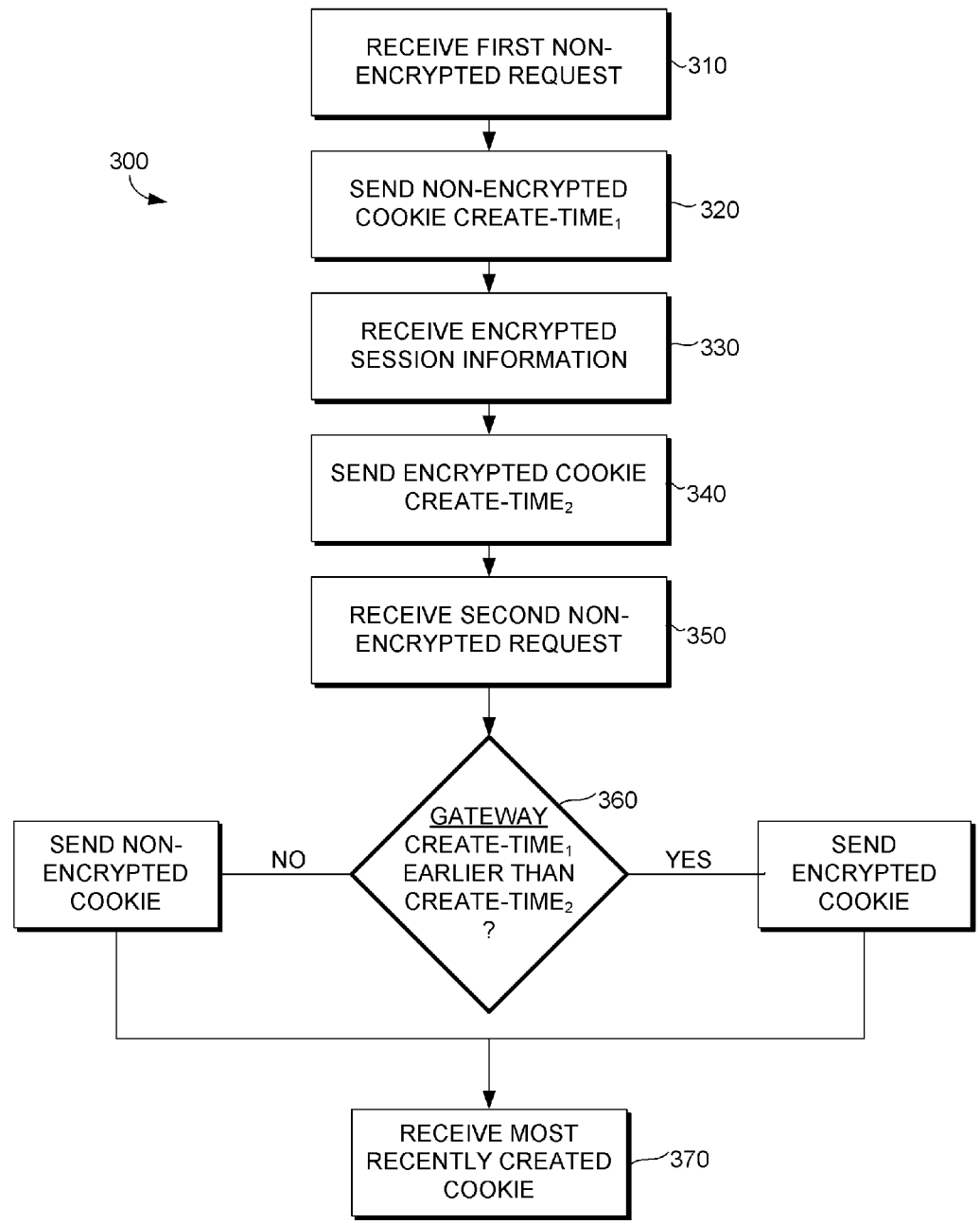
FIG. 3 is a flow diagram illustrating a wireless session of the embodiments of the invention.

FIG. 3 illustrates an example of a computer executed method 300 to manage a wireless session. A wireless device makes a first request for non-secure, or non-encrypted information through a browser to a particular server, as shown by step 310. The server responds to the client request by returning the requested information, along with a non-encrypted HTTP cookie, as shown by step 320. Since this is a non-secure session, the non-encrypted HTTP cookie is stored on a gateway. This non-encrypted HTTP cookie contains a header with attributes, such as a name/value pair, a path, a domain name, a deletion time, and whether the HTTP cookie is intended only for encrypted connections. In addition, the server also includes an HTTP cookie attribute for the time in which the cookie was created. At a later time, the wireless device may request secure, or encrypted information from the same website, to the same server, as shown by step 330. As previously mentioned, an example of encrypted information would be a username and password. Upon receiving the encrypted information, the server may confirm or authenticate the username and password back to the client. The server will also return an encrypted HTTP cookie with the confirmation, as shown by step 340, which contains the time of encrypted cookie creation as part of its header. Since this is a secure session, the encrypted HTTP cookie bypasses the gateway and is sent and stored at the wireless device. If the wireless device revisits the same website in a second non-encrypted session, shown as step 350, the gateway will compare the creation times of the two different HTTP cookies, as shown in the decision block 360. The gateway will then send the most recently created HTTP cookie to the server, along with the client request, as shown by step 370. By implementing a creation time for each HTTP cookie created, there is just one HTTP cookie sent to the server, which contains the most recent information. This prevents the server from invalidating a session, as a result of receiving multiple HTTP cookies from the same client.

Figure 4:
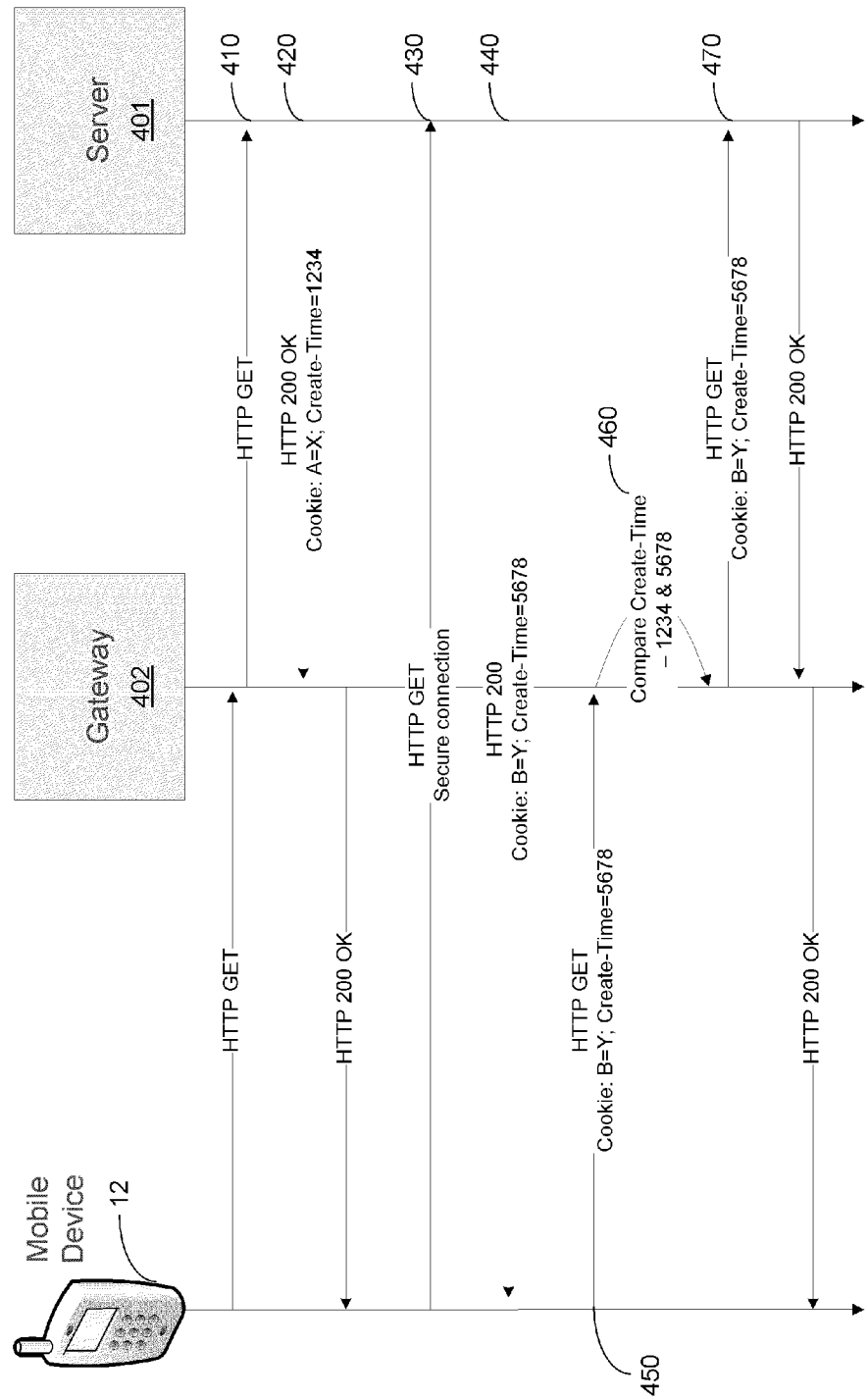
FIG. 4 is a block diagram illustrating a wireless communication system and process of the embodiments of the invention.

FIG. 4 illustrates a system of wireless communication. A wireless device 12 sends a request to a web based server 401. This request can be implemented by using a web browser, and a combination of wired and wireless communication through an interconnected computing network, such as the Internet. A gateway 402 provides an intermediary link in communication between the one or more wireless devices 12 and the web based server 401.

When a wireless device 12 sends a request of a non-secure nature to the web based server 401, shown as step 410, the web based server 401 sends the results of the request back to the wireless device 12, along with a non-secure HTTP cookie, shown as step 420. This non-secure HTTP cookie is illustrated as having a create-time equal to 1234, and is labeled as Cookie A=X. The create-time equal to 1234 is formed as part of the header of Cookie A. Since the capacity of a wireless device 12 is limited, this non-secure HTTP Cookie A is stored on the gateway 402. If a wireless device 12 has a secure session with the web based server 401, shown as step 430, the web based server 401 will return the results of that session to the wireless device 12 as before, but will also send back a secure HTTP cookie, shown as step 440. This secure HTTP cookie is illustrated as having a create-time equal to 5678, and is labeled as Cookie B=Y. The create-time equal to 5678 is formed as part of the header of Cookie B. Since any secure HTTP cookies are encrypted, this prohibits the gateway 402 from viewing or storing any secure HTTP cookies. Therefore, the secure HTTP Cookie B is stored on the wireless device 12.

In FIG. 4, the same web based server 401 handles multiple HTTP cookies with subsequent requests from the same wireless device 12. When a wireless device 12 sends a request to the web based server 401, along with a previously created HTTP cookie, as illustrated in step 450, the gateway 402 will compare the creation times of the secure HTTP Cookie B originating from the wireless device 12 with the non-secure HTTP Cookie A already stored on the gateway 402, as illustrated in step 460. The gateway 402 will then select the HTTP cookie that was most recently created, in this case, Cookie B with a create-time equal to 5678, as illustrated in step 470. In accordance with embodiments of the invention, only one HTTP cookie, the most recently created HTTP cookie, will be sent to the web based server 401, thereby avoiding an invalidated session.

Many different arrangements of the various components depicted, as well as components not shown, are possible without departing from the spirit and scope of the several embodiments of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the embodiments of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer implemented method of managing a wireless session, comprising:
receiving a first non-encrypted session request from a wireless device;
sending a non-encrypted HTTP cookie comprising a first creation time to said wireless device in response to said receiving a first non-encrypted session request;
receiving encrypted session information from said wireless device;
sending an encrypted HTTP cookie comprising a second creation time to said wireless device in response to said receiving encrypted session information;
receiving a second non-encrypted session request from said wireless device;
receiving one of said non-encrypted HTTP cookie and said encrypted HTTP cookie, wherein said receiving one of said cookies is determined by a most recent creation time of said first creation time and said second creation time; and
maintaining said second non-encrypted session without invalidating either of said encrypted or non-encrypted HTTP cookie of said wireless device.

2. The method of claim 1, wherein said non-encrypted HTTP cookie is received by a gateway.

3. The method of claim 2, wherein said determining a most recent creation time is determined by said gateway.

4. The method of claim 1, wherein said encrypted HTTP cookie is received by said wireless device.

5. The method of claim 1, wherein said first creation time and said second creation time is included in a header of said non-encrypted HTTP cookie and said encrypted HTTP cookie, respectively.

6. The method of claim 5, further comprising: an expiration time included in said header.

7. A computer implemented method of managing a wireless session, comprising:
receiving a first non-encrypted session request from a wireless device to a server;
forwarding said first non-encrypted session request from said wireless device to said server;
receiving a non-encrypted HTTP cookie from said server, comprising a first creation time, in response to said first non-encrypted session request from said wireless device;
receiving a second non-encrypted session request from said wireless device to said server;
receiving an encrypted HTTP cookie, comprising a second creation time, from said wireless device in response to a former secure session with said server;
comparing said first creation time of said non-encrypted HTTP cookie with said second creation time of said encrypted HTTP cookie;
selecting a most recently created HTTP cookie from said non-encrypted HTTP cookie and said encrypted HTTP cookie;
forwarding said second non-encrypted session request from said wireless device to said server; and
forwarding said most recently created HTTP cookie to said server; wherein said second non-encrypted session is maintained without invalidating either of said encrypted or non-encrypted HTTP cookie of said wireless device.

8. The method of claim 7, wherein said non-encrypted HTTP cookie is stored on a gateway.

9. The method of claim 7, wherein said encrypted HTTP cookie is stored on said wireless device.

10. The method of claim 7, wherein said first creation time and said second creation time are included in a header of said non-encrypted HTTP cookie and said encrypted HTTP cookie, respectively.

11. The method of claim 10, further comprising: an expiration time included in said header.

12. A system of wireless communication, comprising:
a web based server, operable to communicate with one or more clients, via a web based browser and an interconnected computing network;

one or more wireless devices, operable to send requests to said web based server, and operable to store a secure HTTP cookie from said web based server in response to a secure session between said one or more wireless devices and said web based server; and a gateway, operable to send requests from said one or more wireless devices to said web based server, and operable to store a non-secure HTTP cookie from said web based server in response to a non-secure session between said one or more wireless devices and said web based server, wherein said gateway is operable to compare a creation time from each of said secure and non-secure HTTP cookies and select a most recently created HTTP cookie for forwarding to said web based server for each request from said one or more wireless devices to said web based server.

13. The system of claim 12, wherein said creation time is included in a header of each of said secure and non-secure HTTP cookies.

14. The system of claim 13, further comprising: an expiration time included in said header.

15. The system of claim 12, wherein either of said secure session or said non-secure session is maintained without invalidating either of said secure HTTP cookie or said non-secure HTTP cookie, respectively.

16. The system of claim 12, wherein switching from one of said sessions to another of said sessions is maintained without invalidating either of said secure HTTP cookie or said non-secure HTTP cookie.

17. The system of claim 12, wherein said requests from said wireless devices to said web based server comprises translating wireless protocol commands into HTTP protocol commands, via a mobile-to-HTTP protocol gateway.

* * * * *